United States Patent [19]

Foppe

[11] Patent Number: 5,107,936
[45] Date of Patent: Apr. 28, 1992

[54] ROCK MELTING EXCAVATION PROCESS

[75] Inventor: Werner Foppe, Geilenkirchen, Fed. Rep. of Germany

[73] Assignee: Technologies Transfer Est., Schaan, Liechtenstein

[21] Appl. No.: 275,090

[22] PCT Filed: Jan. 12, 1988

[86] PCT No.: PCT/DE88/00013
§ 371 Date: Nov. 21, 1988
§ 102(e) Date: Nov. 21, 1988

[87] PCT Pub. No.: WO88/05491
PCT Pub. Date: Jul. 28, 1988

[30] Foreign Application Priority Data

Jan. 22, 1987 [DE] Fed. Rep. of Germany ....... 3701676

[51] Int. Cl.$^5$ .......... E21B 7/14; E21B 7/15; E21B 25/10
[52] U.S. Cl. ...................... 175/11; 175/16; 299/14
[58] Field of Search .............. 175/11, 15, 16, 14; 299/14

[56] References Cited

U.S. PATENT DOCUMENTS

| | | | |
|---|---|---|---|
| 10,040 | 9/1853 | Stickney | 175/11 |
| 914,636 | 3/1909 | Case | 175/15 X |
| 3,468,387 | 9/1969 | Benson | 175/16 |
| 3,539,221 | 11/1970 | Gladstone | 175/16 X |
| 3,788,703 | 1/1974 | Thorpe | 175/16 X |
| 4,066,138 | 1/1978 | Salisbury et al. | 175/16 |

FOREIGN PATENT DOCUMENTS 2554101 1/1986 Fed. Rep. of Germany .
0426035 10/1974 U.S.S.R. .................. 175/14

OTHER PUBLICATIONS

William Maurer, *Novel Drilling Techniques* Pergamon Press, London, 1968, pp. 86-91, 98-99, 68-17738.
*Mining Congress Journal* Jun. 1972 "An Electron Beam Gun for Hard-Rock Excavation Tests" B. W. Shumacher, pp. 36-42.
*Petroleum Engineer*, vol. 46, No. 7 Jul. 1974 "Melting Glass-Lined Holes: New Drilling Technology", D. L. Sims, pp. 80-92.
*ISA Transactions*, vol. 13, No. 3, 1974, "Subterrene Instrumentation Requirements", J. W. Neudecker, pp. 199-201.

*Primary Examiner*—David J. Bagnell
*Attorney, Agent, or Firm*—Horst M. Kasper

[57] ABSTRACT

In a heat drilling process for tunnels, deep well and exploration boreholes, only a gap defining the outer profile of the tunnel or borehole is melted down. The drill core surrounded by this gap initially remains and is then extracted at intervals via the melted zone. It is expedient for the drill core to be sheared off and extracted continuously after it has passed a cooling zones. The height of the drill core which first remains in the borehole is determined such that the molten rock can be pressed into the drill core, whereby for this pressing in the necessary pressure is maintained essentially constant independently of the depth of the borehole concerned.

7 Claims, No Drawings

ROCK MELTING EXCAVATION PROCESS

DESCRIPTION

The invention relates to a heat drilling process for the drilling of tunnel, deep well and exploration boreholes, in which the profile of the tunnel or borehole is melted down by means of a heat source and during the drilling progress the resulting molten rock is pressed into the surrounding side rock.

Such a process is known from DE-PS 25 54 101. In this known process the whole of the drilled tunnel or borehole cross section is melted. The resulting molten material has to be pressed into the surrounding rock by means of the Lithofrac technique. A hydrogen-oxygen mix is used as the heat source. These fuel gases have to be supplied at higher pressures as the depth of drilling increases, since at greater drilling depths the overburden pressure of the side rock increases and accordingly the shear forces in the rock grow. Thus as the depth of drilling increases the molten material necessitates higher pressures for opening up the side rock and pressing in the molten material. Once the limit of the technically possible pressure generation in the fuel gas is reached, the known process comes to a halt.

The task of the present invention consists in the further development of a process of the kind described at the beginning in such a way that is disadvantages are avoided and, in particular with reduced energy input, an outflow of molten rock can be achieved essentially independently of the depth of drilling and at a high rate of drilling progress.

In a process of the kind mentioned at the beginning this task is solved in accordance with the invention in that only a gap defining the outer profile of the tunnel or the borehole is melted away, this surrounding a drill core which is extracted at an adjustable distance behind the melting zone.

Thus on application of the process in accordance with the invention the drill core is not melted. Rather the melting is restricted solely to a gap of which the width can be determined in accordance with the technical requirements of the heat drilling equipment used, the supply facilities and the drill core shear and lifting plant.

After removal of the drill core above the melting zone it is assured that the overburden pressure in the area of the drill core can be maintained largely constant, so that the molten rock resulting from the outer profile of the borehole is pressed into the drill core. Hence despite the fact that the depth of the borehole increases, it is possible to work with approximately constant pressures in the melting area since the shear forces are maintained low in the drill core area and the pressures no longer have to be dimensioned on the basis of the high shear forces prevailing in the rock surrounding the exterior of the borehole.

In the process in accordance with the invention the pressing in of the molten rock obtained is even made easier as the depth increases, thanks to the constant reduction of the overburden pressure in the drill core area. Due to the increasing internal rock pressure at the bottom of the drill core, the latter bursts as soon as the heat drilling equipment melts the drill core out of the rock course and thus releases it from external counterpressure. The flow of the molten rock caused by the melting pressure into the now cracked drill core means that either the core volume is compacted, or it is increased by the amount of molten rock absorbed from the outer borehole profile, or a corresponding uplift.

The process in accordance with the invention can be executed in such a way that after the drill core has passed through a cooling zone it is sheared off and continually extracted.

As heat source for the execution of the process in accordance with the invention a hydrogen-oxygen mix, laser beams, ionized glass plasma beams, electric arcs and electron beams may be considered in particular.

Thus in the application of the heat drilling process in accordance with the invention an exterior borehole profile which is as narrow as possible is melted out, whereby a drill core which is as large as possible remains and after this has passed through the inner cooling zone of the heat drilling equipment it is sheared off and removed by means of a conveyor device. Where very deep drilling is carried out, the molten material is pressed out over the drill core area so that as the depth of the borehole increases it is possible to work with substantially constant fuel gas pressure.

I claim:

1. Heat drilling process for the drilling of tunnel, deep well and exploration boreholes, comprising the steps
    melting down the profile of the tunnel or borehole by means of a heat source, pressing the resulting molten rock into the surrounding side rock during the drilling progress, wherein only a gap defining the outer profile of the tunnel or borehole is melted down, which surrounds a drill core, which is extracted at an adjustable distance behind the melting zone.

2. Process in accordance with claim 1, further comprising
    shearing off and continuously extracting the drill core after it has passed through a cooling zone.

3. Process in accordance with claim 1, further comprising
    using a hydrogen-oxygen mix as heat source.

4. Process in accordance with claim 1, further comprising
    using laser beams as a heat source.

5. Process in accordance with claim 1, further comprising
    using an ionized glass plasma beam as a heat source.

6. Process in accordance with claim 1, further comprising
    using an electric arc as a heat source.

7. Process in accordance with claim 1, further comprising
    using electron beams as a heat source.

* * * * *